US010193866B2

(12) United States Patent
Deb et al.

(10) Patent No.: US 10,193,866 B2
(45) Date of Patent: *Jan. 29, 2019

(54) PRIVATE NETWORK PEERING IN VIRTUAL NETWORK ENVIRONMENTS

(71) Applicant: Amazon Technologies, Inc., Seattle, WA (US)

(72) Inventors: Bashuman Deb, Herndon, VA (US); Andrew Bruce Dickinson, Seattle, WA (US); Christopher Ian Hendrie, Centreville, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,052

(22) Filed: Oct. 30, 2017

(65) Prior Publication Data

US 2018/0054421 A1 Feb. 22, 2018

Related U.S. Application Data

(63) Continuation of application No. 14/109,535, filed on Dec. 17, 2013, now Pat. No. 9,807,057.

(51) Int. Cl.
*H04L 29/06* (2006.01)
*H04L 29/08* (2006.01)
*H04L 29/12* (2006.01)

(52) U.S. Cl.
CPC .......... *H04L 63/0272* (2013.01); *H04L 61/00* (2013.01); *H04L 67/104* (2013.01)

(58) Field of Classification Search
CPC .................................................. H04L 63/0272

USPC ........................................................... 726/15
See application file for complete search history.

(56) References Cited

U.S. PATENT DOCUMENTS

| 6,240,402 | B1 | 5/2001 | Lynch-Aird |
| 7,325,140 | B2 | 1/2008 | Carley |
| 7,380,124 | B1 | 5/2008 | Mizell et al. |
| 7,505,962 | B2 | 3/2009 | Shariff et al. |

(Continued)

OTHER PUBLICATIONS

U.S. Appl. No. 13/149,516, filed May 31, 2011; Jacob Gabrielson.

(Continued)

*Primary Examiner* — Khalil Naghdali
(74) *Attorney, Agent, or Firm* — Robert C. Kowert; Meyertons, Hood, Kivlin, Kowert & Goetzel, P.C.

(57) ABSTRACT

Methods and apparatus for private network peering in virtual network environments in which peerings between virtual client private networks on a provider network may be established by clients via an API to a peering service. The peering service and API 104 may allow clients to dynamically establish and manage virtual network transit centers on the provider network at which virtual ports may be established and configured, virtual peerings between private networks may be requested and, if accepted, established, and routing information for the peerings may be specified and exchanged. Once a virtual peering between client private networks is established, packets may be exchanged between the respective client private networks via the peering over the network substrate according to the overlay network technology used by the provider network, for example an encapsulation protocol technology.

20 Claims, 14 Drawing Sheets

(56) References Cited

U.S. PATENT DOCUMENTS

| | | | |
|---|---|---|---|
| 7,639,632 B2 * | 12/2009 | Sarkar | H04L 12/4641 370/254 |
| 7,779,461 B1 | 8/2010 | Liu et al. | |
| 7,937,438 B1 | 5/2011 | Miller et al. | |
| 7,945,640 B1 | 5/2011 | VanTine | |
| 7,949,785 B2 | 5/2011 | Alkhatib et al. | |
| 7,953,865 B1 | 5/2011 | Miller et al. | |
| 7,991,859 B1 | 8/2011 | Miller et al. | |
| 8,117,289 B1 | 2/2012 | Miller et al. | |
| 8,131,852 B1 | 3/2012 | Miller et al. | |
| 8,201,237 B1 | 6/2012 | Doane et al. | |
| 8,224,971 B1 | 7/2012 | Miller et al. | |
| 8,230,050 B1 | 7/2012 | Brandwine et al. | |
| 8,239,538 B2 | 8/2012 | Zhang et al. | |
| 8,312,129 B1 | 11/2012 | Miller et al. | |
| 8,345,692 B2 | 1/2013 | Smith | |
| 8,352,941 B1 | 1/2013 | Protopopov et al. | |
| 8,543,665 B2 | 9/2013 | Ansari et al. | |
| 8,625,603 B1 | 1/2014 | Ramakrishnan et al. | |
| 9,628,294 B1 | 4/2017 | Brandwine et al. | |
| 9,807,057 B1 | 10/2017 | Deb et al. | |
| 2003/0084104 A1 | 5/2003 | Salem et al. | |
| 2004/0252698 A1 | 12/2004 | Anschutz et al. | |
| 2005/0198244 A1 | 9/2005 | Eilam et al. | |
| 2008/0307519 A1 | 12/2008 | Curcio et al. | |
| 2009/0262741 A1 | 10/2009 | Jungck et al. | |
| 2010/0057831 A1 | 3/2010 | Williamson | |
| 2010/0103837 A1 | 4/2010 | Jungck et al. | |
| 2010/0115606 A1 * | 5/2010 | Samovskiy | H04L 12/4641 726/15 |
| 2010/0246443 A1 | 9/2010 | Cohn et al. | |
| 2011/0219067 A1 | 9/2011 | Bernosky et al. | |
| 2011/0320605 A1 | 12/2011 | Kramer et al. | |
| 2012/0084113 A1 | 4/2012 | Brandwine et al. | |
| 2012/0084443 A1 | 4/2012 | Theimer et al. | |
| 2014/0282817 A1 * | 9/2014 | Singer | H04L 63/08 726/1 |
| 2014/0325637 A1 | 10/2014 | Zhang | |
| 2015/0074259 A1 | 3/2015 | Ansari et al. | |

OTHER PUBLICATIONS

Wikipedia, "Virtual Private Networks," Aug. 2008, pp. 1-8.
U.S. Appl. No. 13/239,159, filed Sep. 21, 2011, Eric J. Brandwine.
Amazon Web Service, "Amazon Virtual Private Cloud User Guide", API Version, Jun. 15, 2014, pp. 1-162.
Amazon Web Service, "Amazon Elastic Compute Cloud User Guide for Linux", API Version, Jun. 15, 2014, pp. 1-685.
U.S. Appl. No. 14/542,513, filed Nov. 11, 2014, Kevin Christopher Miller.

* cited by examiner

*route table 122A*

| PORT | PEERING ENTITY | ROUTING | |
|---|---|---|---|
| <Port 124A identifier> | <Port 124B identifier> | <advertised address(es)> | <accepted address(es)> |
| . | . | . | . |
| . | . | . | . |
| . | . | . | . |

*route table 122B*

| PORT | PEERING ENTITY | ROUTING | |
|---|---|---|---|
| <Port 124B identifier> | <Port 124A identifier> | <advertised address(es)> | <accepted address(es)> |
| . | . | . | . |
| . | . | . | . |
| . | . | . | . |

US 10,193,866 B2

PRIVATE NETWORK PEERING IN VIRTUAL NETWORK ENVIRONMENTS

This application is a continuation of U.S. patent application Ser. No. 14/109,535, filed Dec. 17, 2013, now U.S. Pat. No. 9,807,057, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for private network peering in virtual network environments are described. More specifically, embodiments of methods and apparatus for establishing peerings between virtualized private networks in overlay network environments are described. Embodiments of the methods and apparatus for private network peering in virtual network environments may, for example, be implemented in the context of a service provider that provides to clients or customers, via an intermediate network such as the Internet, virtualized resources (e.g., virtualized computing and storage resources) implemented on a provider network of the service provider.

In at least some embodiments, the provider network may implement an overlay network on a network substrate that may, for example, use an encapsulation protocol technology for communications between entities on the provider network. In encapsulation protocol technology, network packets may be generated by a network packet source (an entity that generates the network packets), wrapped or encapsulated at an encapsulation layer according to an encapsulation protocol to produce encapsulation protocol packets (also referred to herein as encapsulation packets or network substrate packets). The encapsulation packets may then be routed over a network or network substrate to a destination according to routing information for the encapsulation packets. The routing of the encapsulation packets over the network/network substrate according to the encapsulation information may be viewed as sending the encapsulation packets via overlay network routes or paths over the network substrate. At the destination, the encapsulation layer removes the network packets from the encapsulation packets (a process referred to as decapsulation) and provides or sends the network packets to the network packet destination (an entity that consumes the network packets).

Client Private Networks in Provider Network Environments

Figure 1:
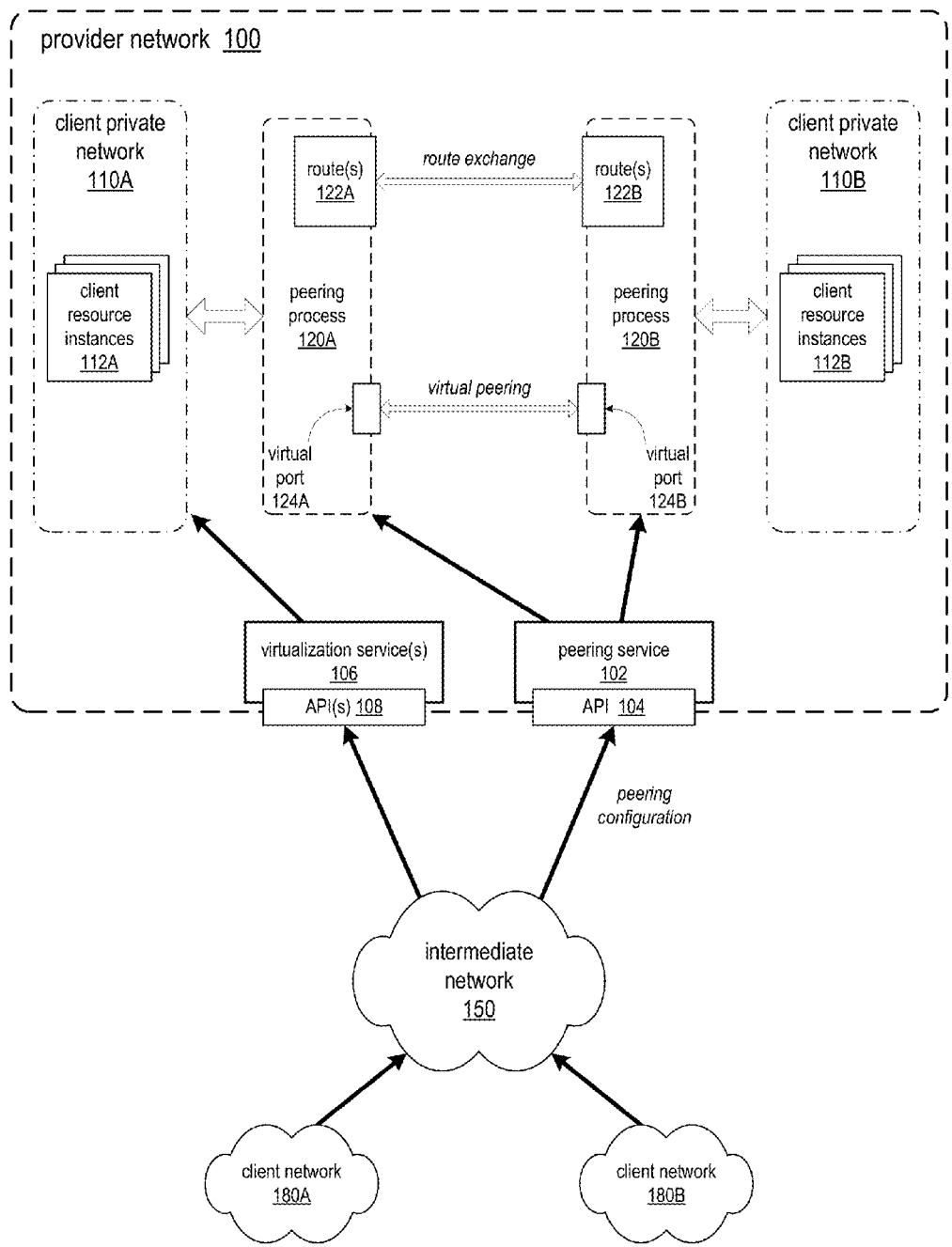
FIG. 1 illustrates an example provider network environment in which embodiments of the methods and apparatus for private network peering in virtual network environments may be implemented.

Embodiments of the methods and apparatus for private network peering in virtual network environments may, for example, be implemented in the context of a service provider that provides to clients or customers, via an intermediate network such as the Internet, virtualized resources (e.g., virtualized computing and storage resources) implemented on a provider network 100 of a service provider, as illustrated in FIG. 1. FIGS. 9 through 13 and the section titled Example provider network environments further illustrate and describe example service provider network environments in which embodiments of the methods and apparatus as described herein may be implemented. Referring to FIG. 1, in at least some embodiments of a provider network 100, at least some of the resources provided to clients of a service provider via the provider network may be virtualized computing resources implemented on multi-tenant hardware that is shared with other client(s) and/or on hardware dedicated to the particular client. Each virtualized computing resource may be referred to as a resource instance 112. Resource instances 112 may, for example, be rented or leased to clients of the service provider. For example, clients of the service provider (represented in FIG. 1 by client networks 180A and 180B), via external client device(s) coupled to the provider network via an intermediate network 150 such as the Internet, may access one or more services 106 of the provider network via application programming interfaces (APIs) 108 to the services to obtain and configure resource instances 112.

At least some of the resource instances 112 on the provider network 100 may be implemented according to hardware virtualization technology that enables multiple operating systems to run concurrently on a host computer, i.e. as virtual machines (VMs) on the host. A hypervisor, or virtual machine monitor (VMM), on a host presents the VMs on the host with a virtual platform and monitors the execution of the VMs. Each VM may be provided with one or more private IP addresses; the VMM on a respective host may be aware of the private IP addresses of the VMs on the host. For further information about hardware virtualization technology on a provider network, see FIG. 10.

Referring to FIG. 1, the provider network 100 may include a network substrate that includes networking devices such as routers, switches, network address translators (NATs), and so on, as well as the physical connections among the devices. In at least some embodiments, the VMMs or other devices or processes on the network substrate may use encapsulation protocol technology to encapsulate and route network packets (e.g., client IP packets) over the network substrate between client resource instances 112 on different hosts within the provider network 100. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. In at least some embodiments, the encapsulation protocol technology may include a mapping service that maintains a mapping directory that maps IP overlay addresses (public IP addresses) to substrate IP addresses (private IP addresses) and that may be accessed by various processes on the provider network 100 for routing packets between endpoints on the network substrate. For further information about a virtual network technology that uses an encapsulation protocol to implement an overlay network on a network substrate, see FIGS. 9 through 13.

Figure 12:
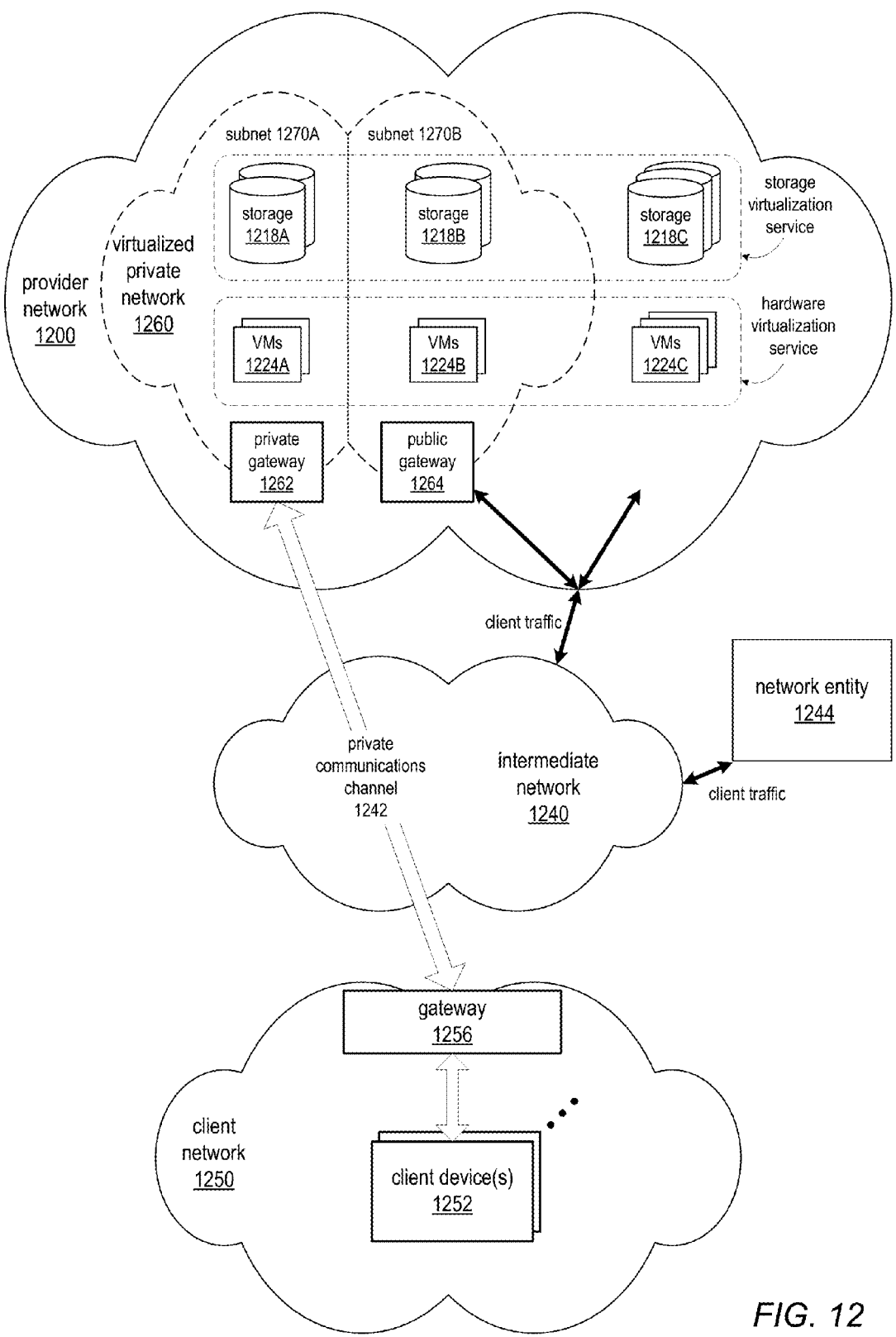
FIG. 12 illustrates an example provider network that provides virtualized private networks to at least some clients, according to at least some embodiments.
Figure 13:
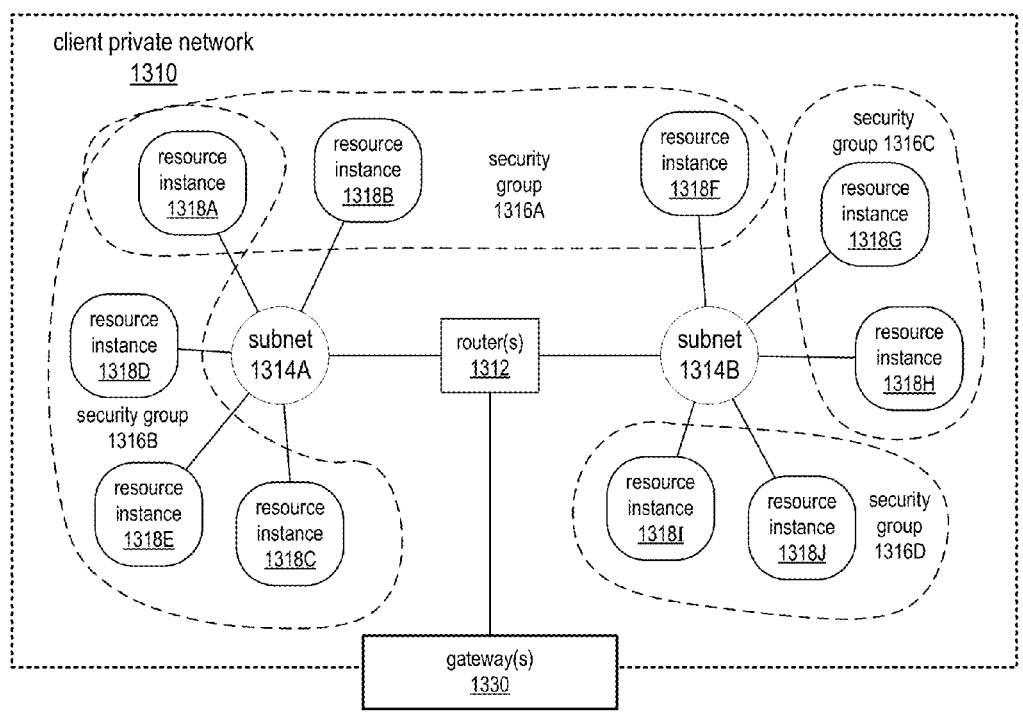
FIG. 13 illustrates subnets and security groups in an example virtual private network implementation on a provider network, according to at least some embodiments.

Referring to FIG. 1, a service provider may provide one or more services 106 with APIs 108 that allow clients to provision logically isolated sections of the provider network in which the clients can launch their respective resource instances in a client-defined virtual network, referred to herein as a virtualized private network or client private network, or as simply a private network. FIG. 1 illustrates two example client private networks 110A and 110B. Via the APIs 108, a client (represented in FIG. 1 by client networks 180A and 180B) may control the virtual networking environment of the client's private network 110, including but not limited to selecting private IP address ranges, creating subnets, and configuring route tables, network gateways, load balancers, routers, and other network functionalities. Via the APIs 108, a client may customize the network configuration of their client private network 110. For example, as illustrated in FIG. 12, a client can create a public-facing subnet for web servers that has access to the Internet, and may place backend systems such as databases or application servers in a private-facing subnet with no Internet access. Clients may leverage multiple layers of security, including but not limited to security groups and network access control lists (ACLs), to control access to resource instances in each subnet, for example as illustrated in FIG. 13.

Note that a given client may establish one, two, or more separate private networks 110 on a provider network 100, and that different clients may each establish private networks 110 on a provider network 100. Further note that a client may specify a private IP address space for each client private network 110 on the provider network 100, and that the private IP address spaces of two (or more) client private networks 110 may, but do not necessarily, overlap.

Peering Client Private Networks in Provider Network Environments

In physical network environments, two private data centers may be peered with each other via physical cables that are connected or "patched" between the data centers, for example at a transit center or the like. A border routing protocol may be used to exchange information about the private networks at the data centers (e.g., private network address ranges to be used in the peering). In virtual network environments that allow clients to provision virtual private networks, for example provider networks 100 as illustrated in FIG. 1, the clients' virtual private network(s) 110 are discrete, routed IP containers that are hosted on a provider network 100 and that may be viewed as virtual analogs to physical data centers. However, conventionally, in such virtual network environments, there has been no virtual analog to physical transit centers at which physical cables between data centers are patched to create a peering between the respective private networks at the data centers.

Embodiments of methods and apparatus for private network peering in virtual network environments are described in which peerings between virtual private networks on a provider network may be established by clients via one or more peering services and API(s) to the service(s). Referring to FIG. 1, the peering service(s) 102 and API(s) 104 may allow clients (represented in FIG. 1 by client networks 180A and 180B) to dynamically establish and manage virtual network transit centers on the provider network 100 at which virtual ports 124 may be established and configured, virtual peerings between private networks 110 may be requested and, if accepted, established, and routing information 122 (e.g., route tables) for the peerings may be specified and exchanged. Once a virtual peering between two client private networks 110 is established on the provider network 100, packets may be exchanged between the respective client private networks via the peering over the network substrate according to the overlay network technology used by the provider network 100, for example an encapsulation protocol technology. See FIG. 4 for an example provider network 100 that uses overlay network technology for packet exchanges on a virtual peering between two client private networks 110.

The peering service(s) 102 and API(s) 104, used with overlay network technology on the provider network 100, may enable clients to privately peer their virtual private networks 110 on the provider network 100. Note that a single client may use the peering service(s) 102 and API(s) 104 to establish private peerings between two or more of the client's private networks 110 on the provider network 100, or two or more different clients may use the peering service(s) and API(s) 104 to establish private peerings between two or more of the clients' private networks 110. To facilitate peerings between virtual private networks 110 on the provider network 100, embodiments may provide at least the following capabilities to clients via API(s) 104 to peering service(s) 102 on the provider network 100:

API-based creation of virtual port(s) from a virtual private network 110.
API-based creation of border routes for a virtual port 104.
API-based creation of a peering between two virtual ports.

Figure 2:
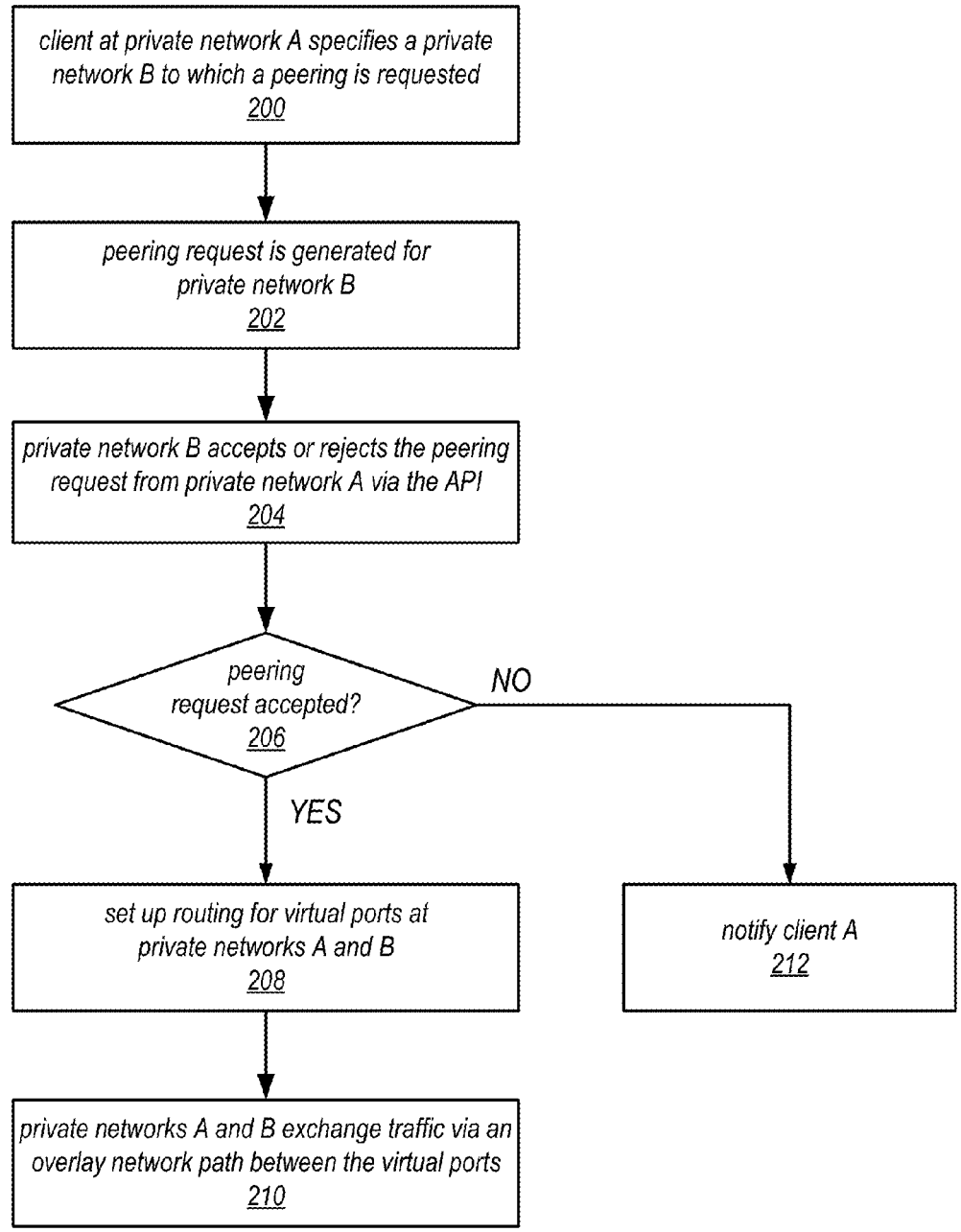
FIG. 2 is a high-level flowchart of a method for private network peering in virtual network environments, according to at least some embodiments.
Figure 5:
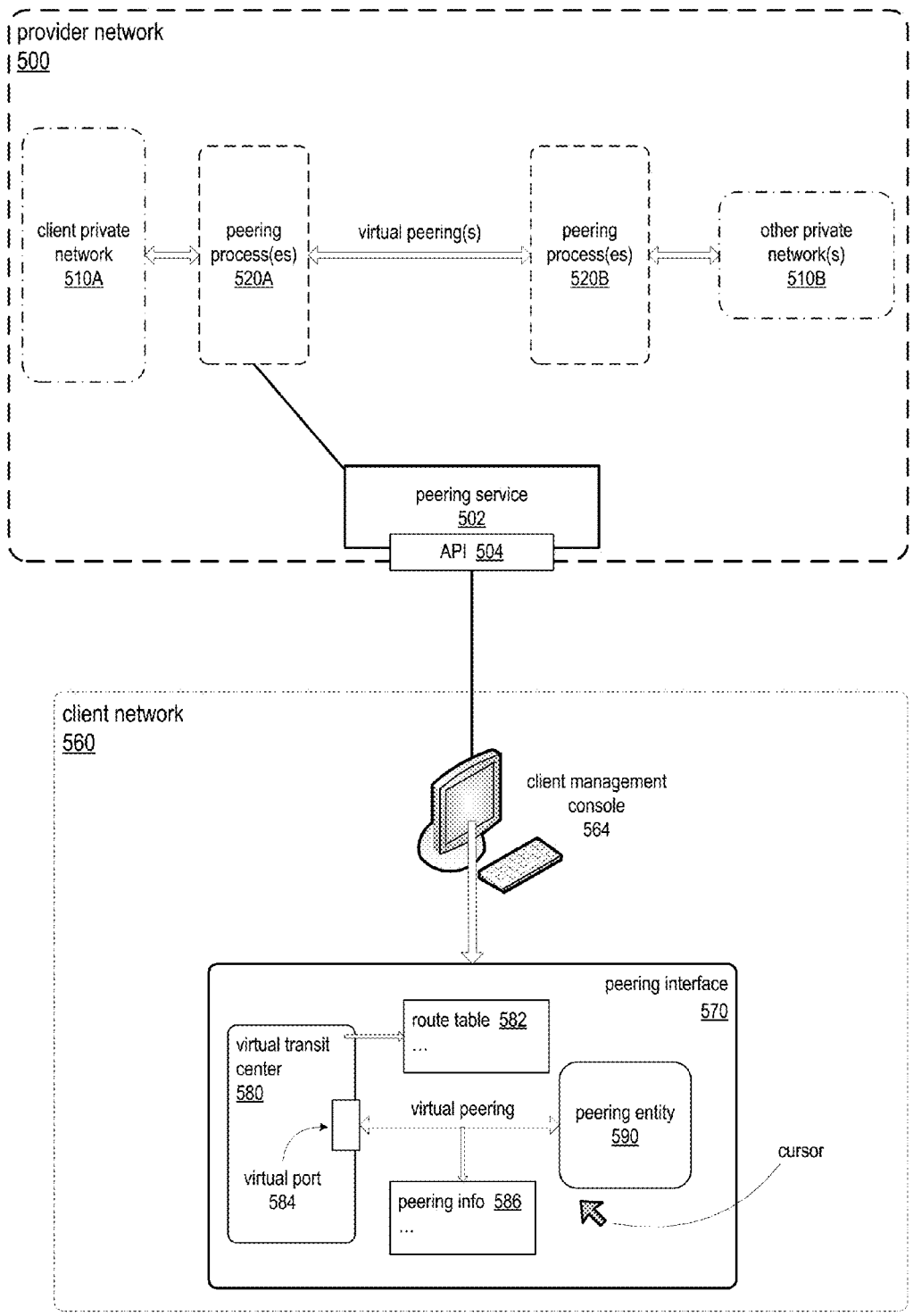
FIG. 5 illustrates a peering service and API in a provider network environment, according to at least some embodiments.

FIG. 2 is a high-level flowchart of a method for private network peering in virtual network environments, according to at least some embodiments. The discussion of FIG. 2 refers to FIG. 1, and two clients are given as examples: client A, corresponding to client network 180A and client private network 110A of FIG. 1, and client B, corresponding to client network 180B and client private network 110A of FIG. 1. In FIG. 2, client A has established and manages a virtual private network (client private network 110A) on provider network 100 via virtualization service(s) 106. As indicated at 200, client A may initiate a peering request by specifying another virtual private network (client private network 110B) on the provider network 100 to which a peering is desired. In at least some embodiments, client A may access a peering service 102 of the provider network 100 via an API 104 to the service 102 to specify client private network 110B. In at least some embodiments, client A may access the API 104 via a management console on a client network 180A external to the provider network 100, for example as illustrated in FIG. 5. Note that if client A has two or more private networks 110 on the provider network, the API may allow client A to select client private network 110A from among a list of the client's private networks 110 as an initiating private network from which a peering to another private network (the target private network) is to be requested.

In some instances, client private network 110B may be another one of client A's private networks 110, and thus selecting the target private network via the API 104 may involve selecting client private network 110B from client A's list of private networks 110. However, client private network 110B may instead belong to a different client (e.g., client B) of the provider network 100. (Note that client B may be a different department or division of an entity than client A, or may be a separate and distinct entity). In at least some embodiments of a provider network 100, clients typically are not aware of and cannot or are not allowed to directly access information about other clients' private network implementations 110 on the provider network 100. Thus, in cases where a client wants to establish a peering from a private network of the client to another client's private network on the provider network, initiating the virtual peering from the client's private network to the other client's private network (e.g., from private network 110A of client A to private network 110B of client B) may require a relationship and/or agreement between the clients such that the "target" client (e.g., client B) grants permission to the initiating client (e.g., client A) to access information about and initiate the peering to the target client's private network. In other words, the peering may be initiated and established according to and as a result of an out-of-band negotiation and agreement between the two clients. In at least some embodiments, in granting permission for a peering, the target client (e.g., client B) may provide information to the initiating client (e.g., client A) that enables the initiating client to view and access at least a basic representation of and/or basic information about the target client's private network (e.g., private network 110B) via the API 104 to the peering service 102 on the initiating client's management console. This provided information may, for example, include an identifier unique to the target client (client B) and/pr an identifier of the target client's private network 110B to which client A wants to establish a peering from private network 110A. In at least some embodiments, the clients may exchange security tokens, e.g. public/private key encrypted tokens, that may be used via the API 104 to the peering service 102 to securely establish identities between the client private networks 110 when initiating and accepting peering requests.

As indicated at 202 of FIG. 2, in response to client A successfully initiating a peering request from private network 110A to private network 110B, a peering request may be generated for private network 110B. In at least some embodiments, generating a peering request may involve displaying a peering request (e.g., as a virtual port representation) on client B's management console (e.g., on client network 180B) according to the API 104 to the peering service 102. In at least some embodiments, client B may select the peering request via the API 104 to display more information about the request, e.g. to view information about the requesting client and/or the private network from which a peering is being requested. As indicated at 204 of FIG. 2, client B may then accept or reject the peering request via the API 104 to the peering service 102 on client B's management console.

Figures 3A, 3B, 3C:
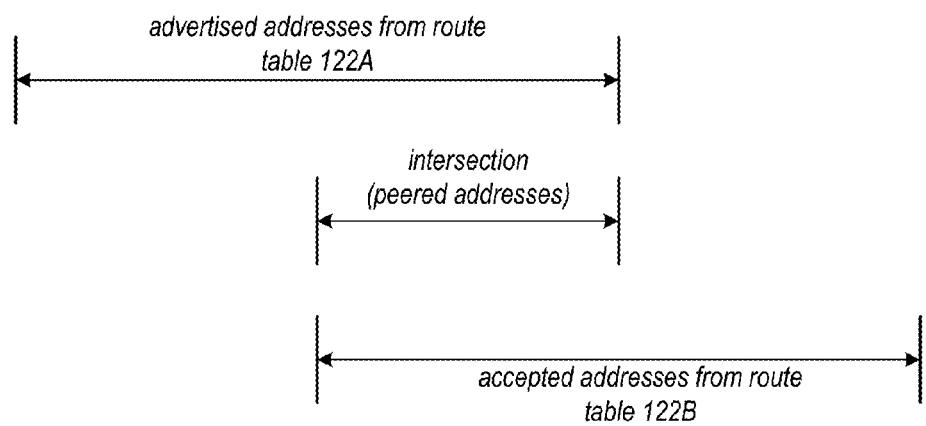
FIGS. 3A through 3C illustrate example route tables for a virtual peering between client private networks on a provider network, according to at least some embodiments.

At 206 of FIG. 2, if client B accepts the peering request, then as indicated at 208 of FIG. 2 clients A and B may specify routing information 122 (e.g., route tables) for the respective virtual ports 124 of the peering. The peering service 102 may notify or indicate to client A that the peering request has been accepted via the API 104 on client A's management console. For example, in at least some embodiments, if the peering request is accepted by client B, a virtual port representation may be displayed on client A's management console. Similarly, a virtual port representation may be displayed on client B's management console. Thus, the peering between private networks 110A and 110B may be represented by virtual port representations on the respective clients' management consoles. Each client may then specify routing information 122 for the virtual ports according to the API 104 to the peering service 102. In at least some embodiments, specifying routing information 122 may involve each client creating a route table for the virtual port 124 that indicates a range of one or more private IP addresses of the respective client private network 110 that are to be advertised to the other client private network 110 via the virtual peering indicated by the virtual ports 124, and a range of one or more private IP addresses that are to be accepted via the virtual peering indicated by the virtual ports 124. FIGS. 3A and 3B illustrate example route tables for a peering as illustrated in FIGS. 1 and 2, according to at least some embodiments. The two clients may exchange this route information 122. As illustrated in FIG. 3C, the subset of private IP addresses of a client private network 110 that is served by the peering is the intersection of the range of addresses that the respective client advertises for the peering and the range of addresses that the other client will accept for the peering.

Figure 4:
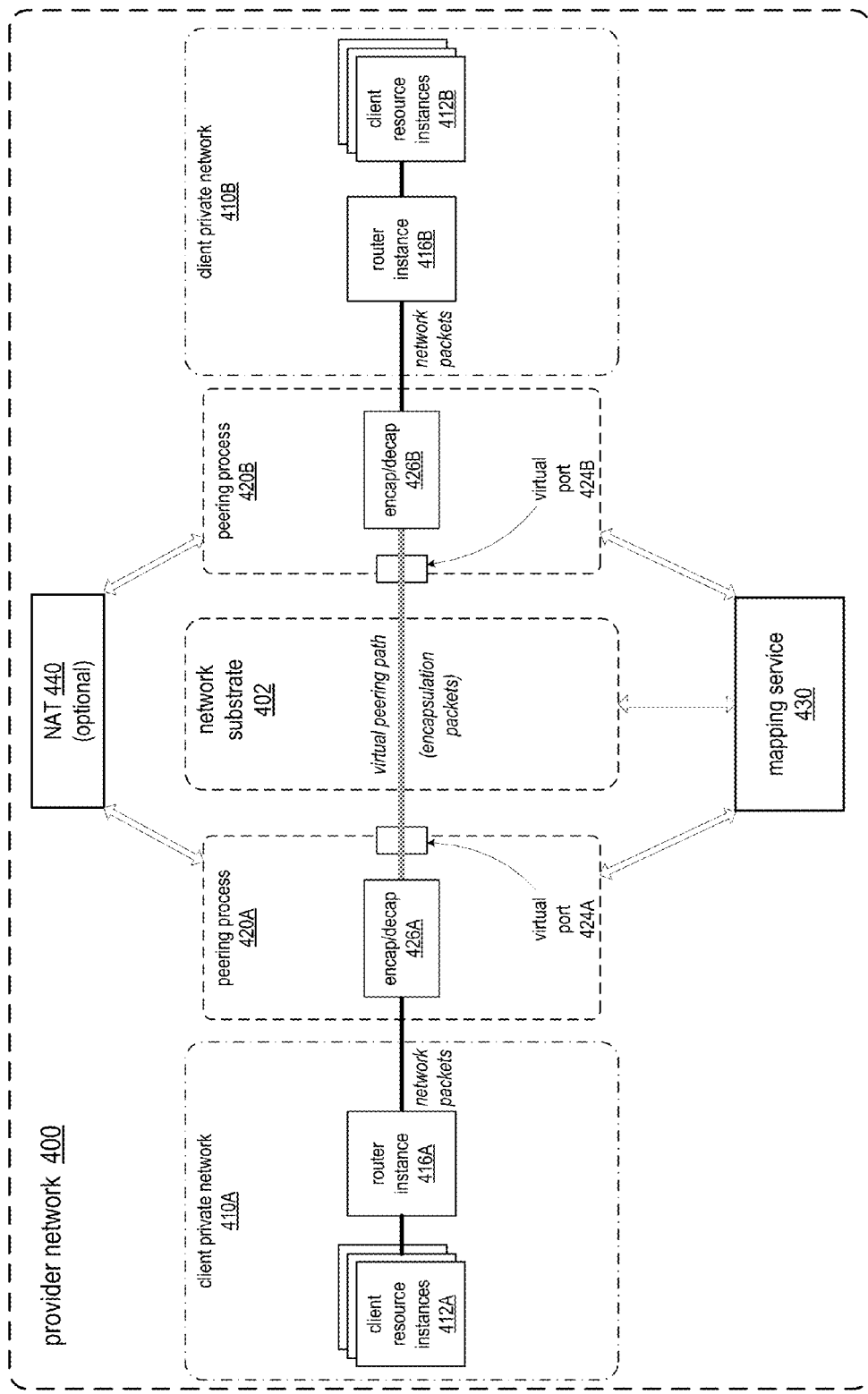
FIG. 4 illustrates routing packets between client private networks over a virtual peering path of an overlay network implemented in an example provider network environment, according to at least some embodiments.

As indicated at 210 of FIG. 2, after the route tables 122 are defined, private networks 110A and 110B may begin exchanging traffic via an overlay network path between the virtual ports 124. In at least some embodiments, an instance of an encapsulation layer process, referred to herein as a peering process 120, may be dynamically implemented for each of the private networks 110A and 110B on one or more computing and/or network devices of the provider network 100. The peering process instances 120 may serve as an interface between the private networks 110 and the overlay network. The peering process instances 120 may be viewed as virtual network transit centers that are used to establish and maintain peerings between clients' virtual private networks 110. In at least some embodiments, the virtual ports 124 and route tables 122 that are established for a peering between private networks 110 may be implemented as objects within the scope of the peering process instances 120. A graphical representation of peering process instances with virtual ports and routes, and the relationship between the peering process instances and client private networks on a provider network, is shown in FIGS. 1 and 4.

In at least some embodiments, the peering process instance 120 associated with a client private network (e.g., peering process instance 120A of private network 110A) may receive network packets from the private network (e.g., from a router instance on private network 110A) that are to be routed over the network substrate via a virtual peering path at the overlay network level (which may be referred to as an overlay network path) to an address range of another private network (e.g., private network 110B), encapsulate the network packets according to an encapsulation protocol of the overlay network, and send the encapsulation packets onto the network substrate to be routed to the peering process instance 120B of private network 110B according to metadata in the encapsulation packet. The peering process instance 120B at private network 110B may receive the encapsulation packets, decapsulate the network packets, and provide the decapsulated network packets to private network 110B, for example by sending the network packets to a router instance on private network 110B for routing to target private IP addresses of resource instances 112B specified by the network packets. A graphical representation of two peering process instances that establish and maintain a virtual peering between client private networks on a provider network is shown in FIG. 4.

In at least some embodiments, each encapsulation packet may include one, two, or more network packets. In various embodiments, the encapsulation protocol may be a standard network protocol such as IPv6 or User Datagram Protocol (UDP), or alternatively may be a non-standard, custom, or proprietary network protocol. The network packets that are encapsulated according to the encapsulation protocol may, for example, be Internet Protocol (IP) technology packets including but not limited to IPv4 (Internet Protocol version 4) packets, IPv6 (Internet Protocol version 6) packets, Transmission Control Protocol (TCP) packets, User Datagram Protocol (UDP) packets, or Internet Control Message Protocol (ICMP) packets. However, the network packets may be packets according to other IP protocols, other standard protocols than IP protocols, or packets according to other non-standard, custom, or proprietary protocols.

At 206 of FIG. 2, if client B rejects the peering request from client A via the API 104 to the peering service 102 on client B's management console, then at 212 the peering service 102 may (but does not necessarily) notify or indicate to client A via the API 104 on client A's management console that the peering request has been rejected by client B.

While not shown, in at least some embodiments, the API 104 to the peering service 102 may allow one or both of the clients that have established a virtual peering between respective client private networks 110 to close or terminate the virtual peering via the clients' management consoles. In addition, one or both of the clients may change or modify the route tables 122 for the virtual peering that were set at element 208 of FIG. 2 as necessary or desired. If a route table 122 is changed, the route information may be provided to the other client's peering process instance 120 so that routing for the peering can be adjusted as necessary.

FIGS. 3A and 3B show example route tables for a virtual peering between client private networks on a provider network as illustrated in FIG. 1, according to at least some embodiments. FIG. 3A shows an example route table 122A that may be created by client A for private network 110A as illustrated in FIG. 1. FIG. 3B shows an example route table 122B that may be created by client B for private network 110B as illustrated in FIG. 1. In at least some embodiments, a route table 122 may include an indication of a virtual port 124 at the respective peering process instance 120 to which address ranges in the table 122 are to be applied (port 124A in route table 122A, port 124B in route table 122B), a peering entity (port 124B in route table 122A, port 124A in route table 122B), a range of advertised addresses for the port 124, and a range of accepted addresses for the port 124 from the peering entity. In at least some embodiments, there may be more than one virtual port 124 defined at a peering process instance 120, and thus the route table 122 for a peering process instance 120 may include more than one entry.

Once the clients establish a peering between two client private networks and generate the respective route tables 122, the peering process instances 120 may exchange the route information for the peering, as shown in FIG. 1, and use the route information (e.g., route tables 122 as shown in FIGS. 3A and 3B) to determine subsets of addresses that are served by the peering. As illustrated in FIG. 3C, in at least some embodiments, the subset of private IP addresses of a client private network 110 that is served by the peering is the intersection of the range of addresses that the respective client advertises for the peering and the range of addresses that the other client will accept for the peering as defined by the clients' route tables 122. For example, in FIG. 3C, the subset of private IP addresses of client private network 110A that is served by the peering is the intersection of the range of addresses that client A advertises for the peering via route table 122A and the range of addresses that client B will accept for the peering as indicated in route table 122B.

FIG. 4 illustrates routing packets between client private networks over a virtual peering path on an overlay network implemented in an example provider network environment, according to at least some embodiments. In at least some embodiments, the peering process instances 420 on the network substrate 402 of a provider network 400 may use encapsulation protocol technology to encapsulate and route network packets over the network substrate 402 between client private networks 410 within the provider network 400. The encapsulation protocol technology may be used on the network substrate 402 to route encapsulated packets (also referred to as network substrate packets) between endpoints (e.g., virtual ports 424) on the network substrate 402 via an overlay network path or route, referred to in FIG. 4 as a virtual peering path. The encapsulation protocol technology may be viewed as providing a virtual network topology overlaid on the network substrate 402. In at least some embodiments, the encapsulation protocol technology may include a mapping service 430 that maintains a mapping directory that maps IP overlay addresses (public IP addresses) to substrate IP addresses (private IP addresses) and that may be accessed by various processes on the provider network 400, including but not limited to the peering process instances 420, for routing packets between endpoints on the network substrate 402. For further information about a virtual network technology that uses an encapsulation protocol to implement an overlay network on a network substrate, see FIGS. 9 through 13.

In at least some embodiments, the peering process instance 420 associated with a client private network (e.g., peering process instance 420A of private network 410A) may receive network packets from the private network (e.g., from resource instances 412A via a router instance 416A on private network 410A) that are to be routed over the network substrate 402 via a virtual peering path at the overlay network level to an address range of another private network (e.g., private network 410B), encapsulate the network packets according to an encapsulation protocol of the overlay network, and send the encapsulation packets via port 424A onto the network substrate 402 to be routed to port 424B of peering process instance 420B of private network 410B according to metadata in the encapsulation packet. The peering process instance 420B at private network 410B may receive the encapsulation packets, decapsulate the network packets, and provide the decapsulated network packets to private network 410B, for example by sending the network packets to a router instance 416B on private network 410B for routing to target private IP addresses of resource instances 412B specified by the network packets.

Figure 10:
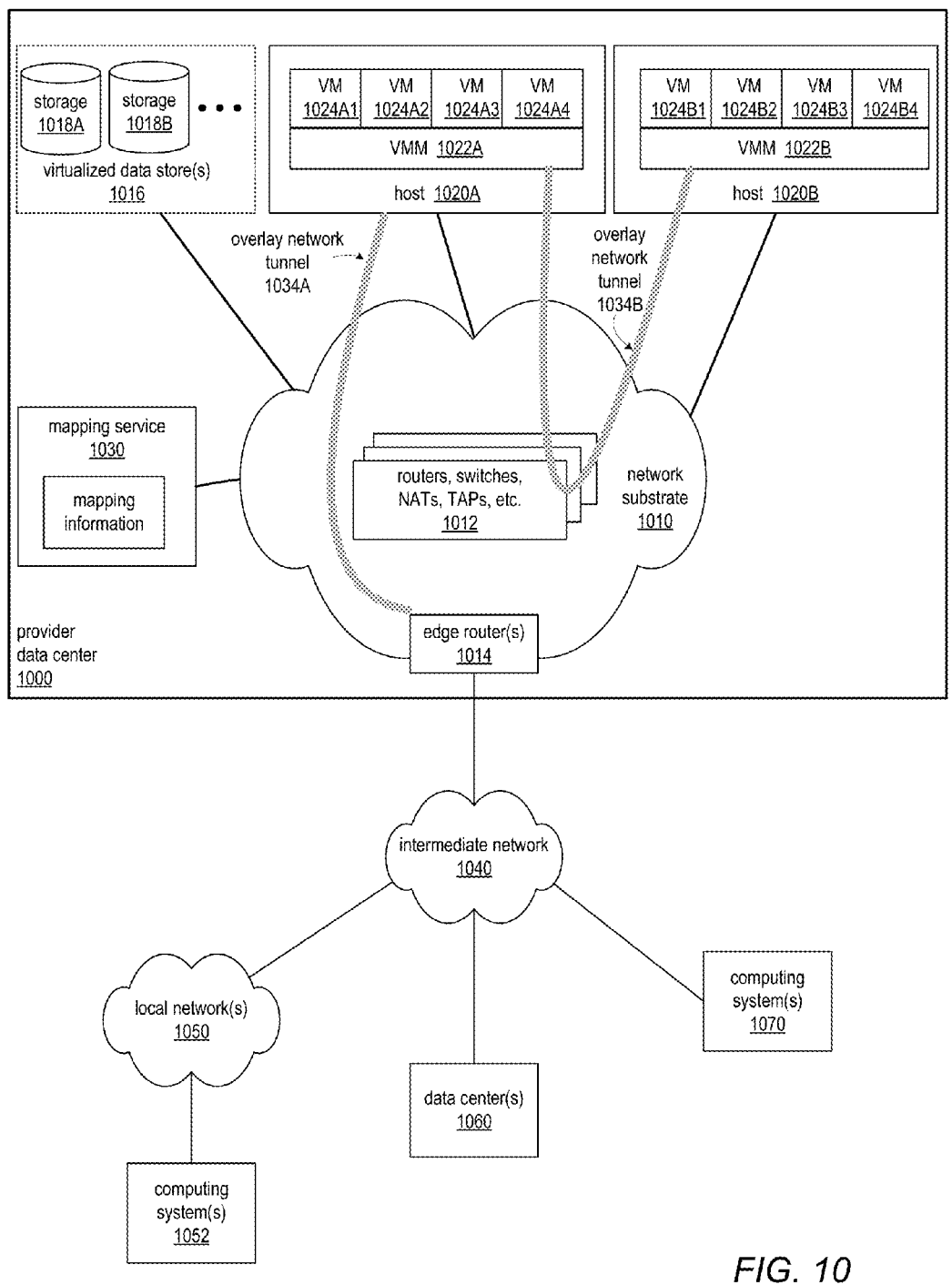
FIG. 10 illustrates an example data center that implements an overlay network on a network substrate using IP tunneling technology, according to some embodiments.

In at least some embodiments, at least some of the resource instances 412 on a private network 410 may be implemented according to hardware virtualization technology that enables multiple operating systems to run concurrently on a host computer, i.e. as virtual machines (VMs) on the host. A hypervisor, or virtual machine monitor (VMM), on a host presents the VMs on the host with a virtual platform and monitors the execution of the VMs. Each VM may be provided with one or more private IP addresses; the VMM on a respective host may be aware of the private IP addresses of the VMs on the host. Router instance(s) 416 on a private network 410 may be implemented in any of a variety of ways. A router instance 416 on a private network 410 may, for example, be a process on or component of a host system on the provider network 400 such as a host system that implements a VMM and one or more VMs. For example, a router instance 416 may be a software process implemented by one or more VMMs on the provider network 400 as illustrated in FIG. 10. As another example, a router instance 416 for a private network 410 may be implemented as or on a resource instance 412 of the private network 410. As yet another example, a router instance 416 for a private network 410 may be implemented as or on a physical network device such as a router device or switch device.

As previously mentioned, private networks on a provider network may have at least partially overlapping private IP address ranges. Embodiments have been described where clients essentially negotiate non-overlapping portions of their respective address ranges that are to be peered via a virtual peering. In some embodiments, clients may instead negotiate an additional, separate address space that does not overlap the private address ranges of either private network. This separate address space may be referred to as an intermediate address space. Network packets from a private network 410 may then be mapped (e.g., via a network address translation (NAT) service 440) into the intermediate address space by the peering process instances 420, or alternatively by the mapping service 430, to be delivered to the other private network 410. To the other private network, the packets appear to have originated from addresses in the intermediate address space. Return traffic sent to the intermediate addresses from the other private network 410 may be mapped (e.g., via NAT 440) back into the private address space of the target private network 410 for delivery to the correct endpoint.

FIG. 5 illustrates a peering service 502 and API 504 in a provider network environment, according to at least some embodiments. A client associated with client network 560 may establish, provision, and manage a client private network 510A on provider network 500 via one or more services of the provider network 500 accessed through a management console 564 on client network 560. The client may access an API 504 of a peering service 502 of provider network 500 via management console 564 to establish and manage virtual peerings from client private network 510A to other private network(s) 510B on the provider network 500 over the network substrate of the provider network 500 via peering process instances 520 at the encapsulation (overlay network) layer of the provider network 500.

In at least some embodiments, the API 504 to service 502 may display a peering interface 570 on console 564. The peering interface 570 may provide one or more graphical and/or textual interface elements that allow the client to create and manage virtual peerings from the client's private network 510A to other private network(s) 510B on the provider network 500. To facilitate the establishment of peerings between private network 510A on the provider network 500 and the other private network(s) 510B, the API 504 may provide to the client, via the interface elements of interface 570, one or more of the following capabilities:

- Ability to create and manage virtual port(s) for private network 510A.
- Ability to create, manage, and modify border routes for the virtual port(s).
- Ability to create and manage peerings between virtual port(s) of private network 510A and virtual port(s) of other private network(s) 510B.

FIG. 5 shows a non-limiting example of a graphical and/or textual interface 570 that may be displayed at a client's console 564 for creating and managing peerings between private networks 510. The interface 570 may show a graphical and/or textual representation of a peering process 520A for a particular client private network 510A, for example as a virtual "transit center" 580. Graphical and/or textual representations of one or more ports 584 in the transit center 580 may be displayed. Graphical and/or textual representations of one or more entities 590 (e.g., other private networks 510B) may be shown, as well as representations of peering(s) between the port(s) 584 and the entity(s) 590. Note that the interface 570 may also show representations of other aspects of the client's network configuration such as a representation of the client private network 510 and one or more components thereof, a representation of the client network 560 and one or more components thereof, and connections between the client's private network 510 and network 560.

The client may, for example, use a cursor control device to select various interface elements provided by interface 570 to, for example, create, display, and modify route table(s) 522, to view additional information, for example information 586 about a peering between a particular port 524 and a particular peering entity 590, and to configure various elements such as virtual port(s) 524. The interface 570 may include other user interface elements than those shown, for example menu or other elements that allow the client to select from among various ones of the client's private networks, elements to select, create, configure, and manage virtual transit center(s) 580 and port(s) 524, elements that allow the client to select or specify target entities 590 (e.g., target private networks 510B of other clients) to which the client wants to establish a peering, and so on.

In at least some embodiments, the API 504 to the peering service 502 may, through interface 570, provide one or more interface elements that allow the client to configure particular ports 524. For example, in addition to allowing the client to define a route table 582 for a virtual port 524, the client may be allowed to specify a particular network protocol or protocols (e.g., TCP, UDP, ICMP, etc.) that will be used for the virtual peering, specify security protocols for the peering, specify bandwidth for the peering, and so on. Note at least some of the port configuration information may be determined via at an out-of-band negotiation between the respective clients associated with the private networks 510 that are to be peered, and may then be configured for the port(s) 524 of the peering via the API 504.

Figure 6A:
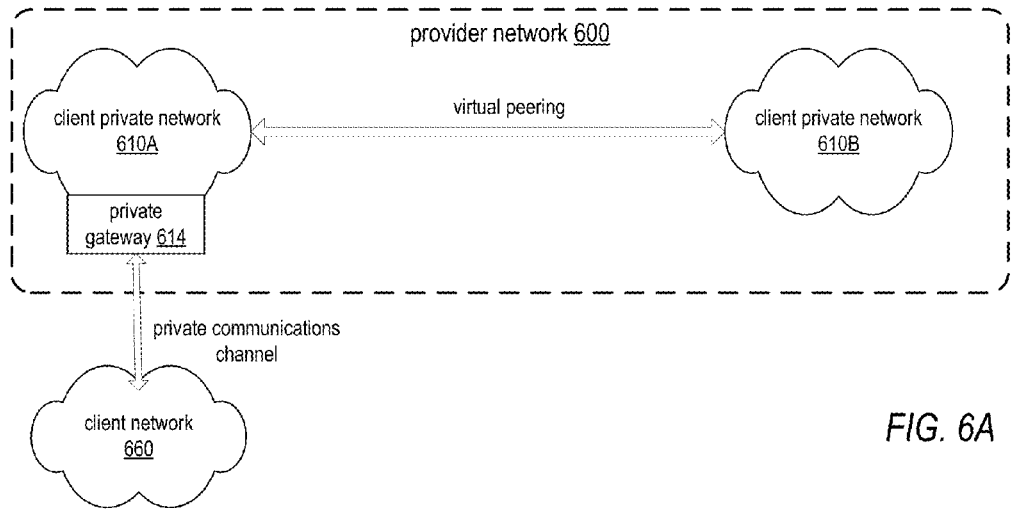
FIGS. 6A through 6C illustrate example use cases for virtual peering between client private networks in a provider network environment, according to at least some embodiments.
Figure 6B:
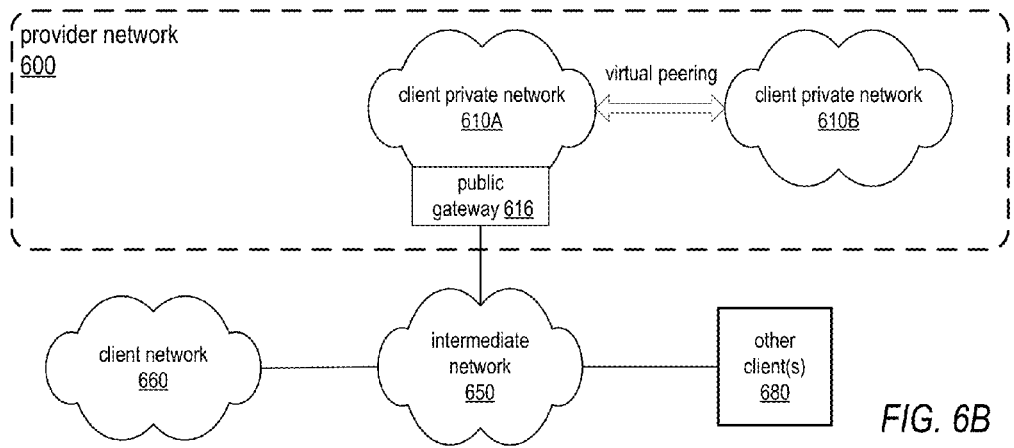
Figure 6C:
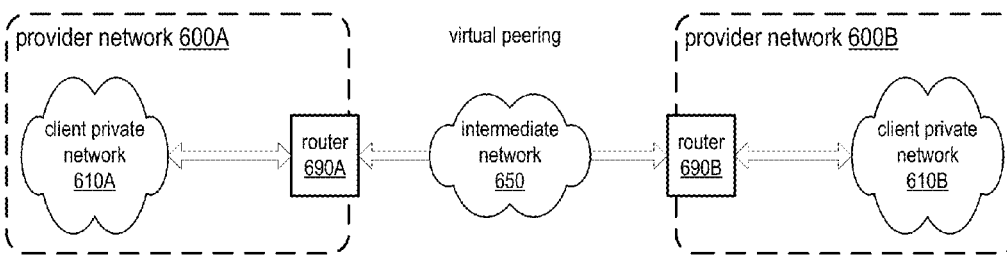

FIGS. 6A through 6C illustrate some example use cases for virtual peering between client private networks in a provider network environment, according to at least some embodiments. FIG. 6A shows an example provider network 600 environment in which a client has established private communications channel between a private gateway 614 at client private network 610A and a gateway at an external client network 660. A virtual peering as described herein may be established between client private networks 610A and 610B on provider network 600. Client private network 610A may be configured to route at least some traffic from client private network 610B received over the virtual peering to endpoints on client network 660 via the private gateway 614 and private communications channel, and vice versa. Note that client private networks 610A and 610B and client network 660 may all belong to the same client, or one or more of the networks may belong to different clients.

As shown in FIG. 6B, in addition to or instead of a private gateway 614, a client private network 610A may include a public gateway 616 that enables resources within the client private network 610A to communicate directly with external endpoints (e.g., endpoints on client network 660, or endpoints at other clients 680) via an intermediate network 650 such as the Internet, and vice versa, instead of or in addition to via a private communications channel as shown in FIG. 6A. A virtual peering as described herein may be established between client private networks 610A and 610B on provider network 600. Client private network 610A may be configured to route at least some traffic from client private network 610B received over the virtual peering to external endpoints via public gateway 616 and the intermediate network 650, and vice versa. Note that client private network 610B may not be provisioned with a public or private gateway, and thus resources on private network 610B may only be made accessible to external endpoints via client private network 610A and the virtual peering.

FIGS. 1 through 5 show examples where a virtual peering is established over a network substrate between two private networks on a provider network. However, a service provider may have multiple, geographically disperse data centers that each implement a provider network on which resource instances are implemented and in which client private networks may be provisioned. FIG. 6C illustrates that, in at least some embodiments, virtual peerings may be established between two client private networks 610 on different provider networks 600. Provider networks 600A and 600B may be implemented at two geographically disperse data centers, for example data centers that provide the services of the service provider to different geographic regions. A virtual peering may be established between client private network 610A on provider network 600A to client private network 610B on provider network 600B. On the virtual peering, network packets may be routed from client private network 610A to a router 690A of provider network 600A over a network substrate according to an overlay network protocol. The network packets may then be routed from the router 690A to a router 690B of provider network 600B over an intermediate network 650 such as the Internet. Alternatively, the network packets may be transmitted to router 690B of provider network 600B via a private communications channel or via a dedicated communications link, for example via a dedicated fiber optic cable that links the two data centers. At provider network 600B, the network packets may be routed from router 690B to client private network 610A over a network substrate according to an overlay network protocol.

Figure 7A:
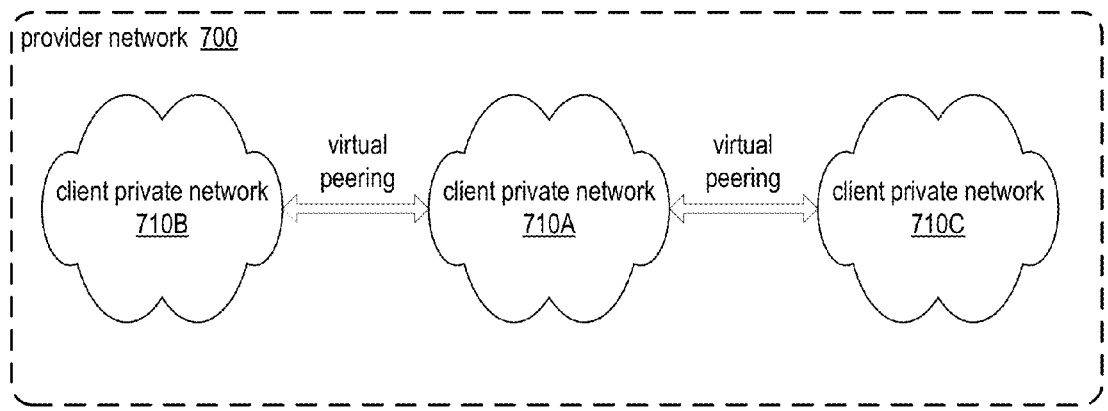
FIGS. 7A and 7B illustrate example configurations for peerings between multiple client private networks, according to at least some embodiments.
Figure 7B:
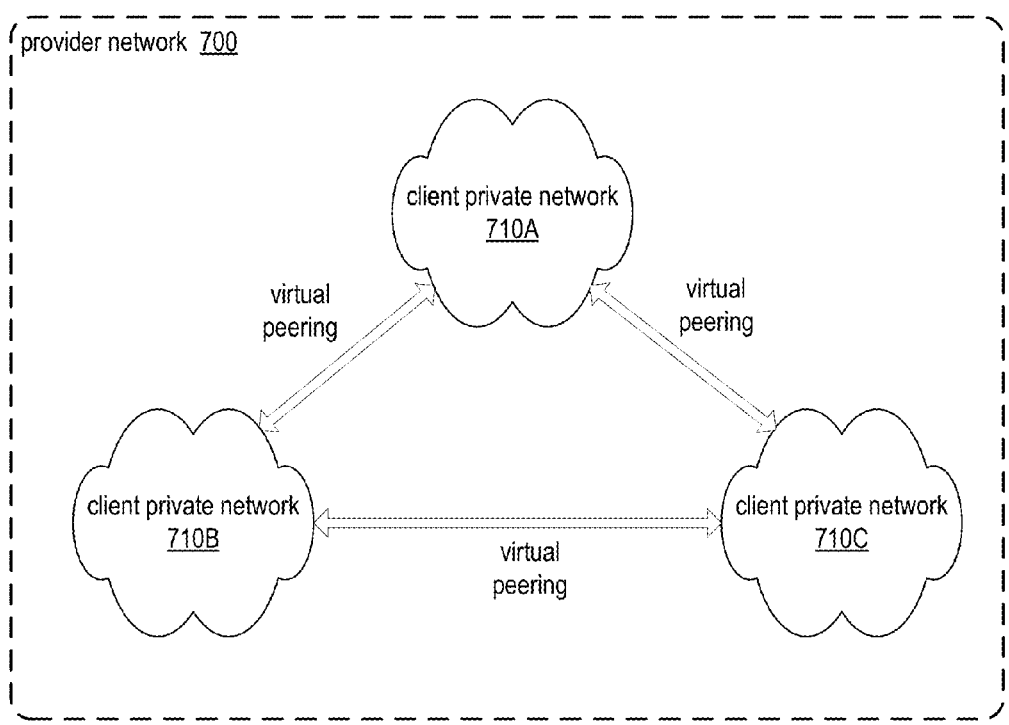

FIGS. 7A and 7B illustrate example configurations for peerings between multiple client private networks on a provider network, according to at least some embodiments. In these examples, three client private networks 710A, 710B, and 710C have been established on provider network 700. Note that client private networks 710A, 710B, and 710C may all belong to the same client, or one or more of the networks 710 may belong to different clients. Also note that similar configurations may be extended to more than three private networks 710. In the example shown in FIG. 7A, a virtual peering has been established between client private networks 710A and 710B, and another virtual peering has been established between client private networks 710A and 710C. However, there is no peering between 710B and 710C. Client private network 710A may be configured to route at least some traffic from client private network 710B received via the virtual peering between 710A and 710B to endpoints on client private network 710C via the virtual peering between 710A and 710C, and vice versa. In the example shown in FIG. 7B, a virtual peering has also been established between client private networks 710B and 710C. In this example, at least some traffic may be exchanged between 710B and 710C via the virtual peering without being routed through 710A.

Figure 8A:
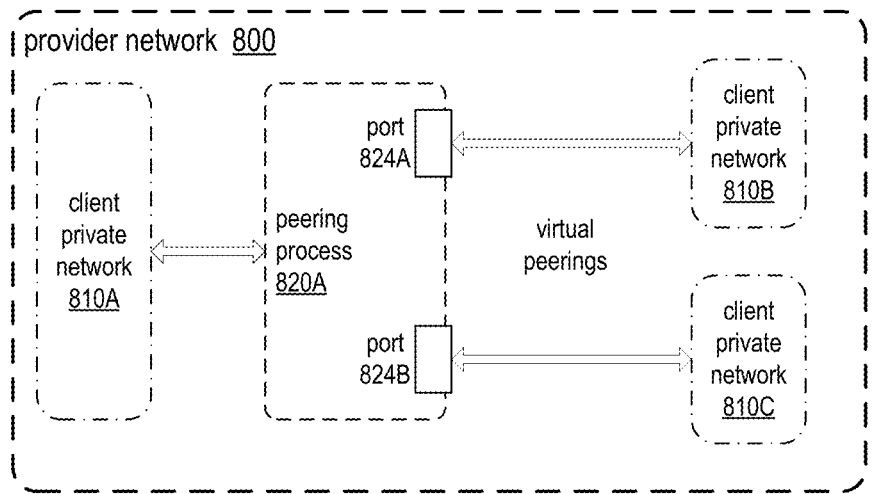
FIGS. 8A and 8B illustrate example configurations for virtual network transit centers between client private networks, according to at least some embodiments.
Figure 8B:
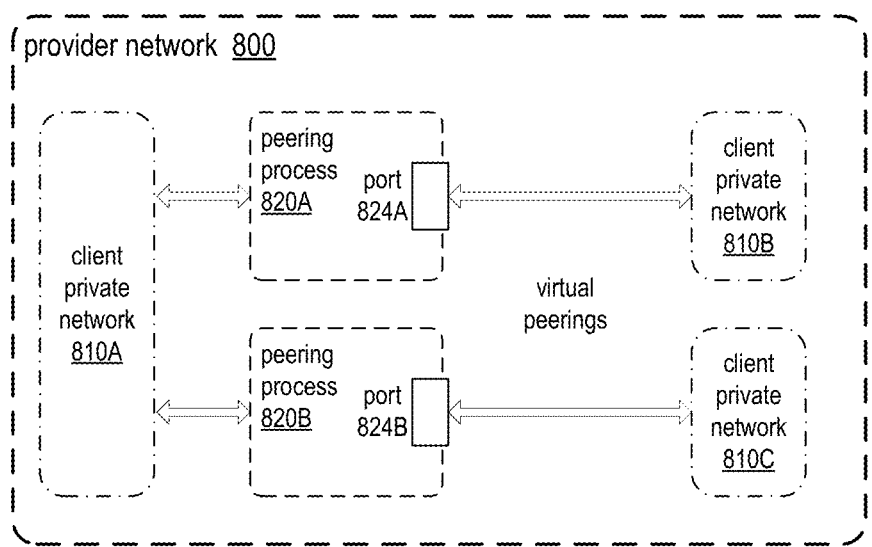

FIGS. 8A and 8B illustrate example configurations for virtual transit centers (peering process instances) between client private networks, according to at least some embodiments. In these examples, three client private networks 810A, 810B, and 810C have been established on provider network 800. Note that client private networks 810A, 810B, and 810C may all belong to the same client, or one or more of the networks 810 may belong to different clients. Also note that similar configurations may be extended to more than three private networks 810. In both FIGS. 8A and 8B, a virtual peering has been established between client private networks 810A and 810B, and another virtual peering has been established between client private networks 810A and 810C. In FIG. 8A, a single peering process instance 820A has been created for client private network 810A to peer with networks 810B and 810C, with two ports 824A and 824B on peering process instance 820A that are used to peer with networks 810B and 810C, respectively. In FIG. 8B, separate peering process instances 820A and 820B have been created for client private network 810A to peer with networks 810B and 810C, respectively, each peering process instance 820 with a port 824 used to peer with a respective client private network 810.

Example Provider Network Environments

This section describes example provider network environments in which embodiments of the methods and apparatus for private network peering in virtual network environments may be implemented. However, these example provider network environments are not intended to be limiting.

Figure 9:
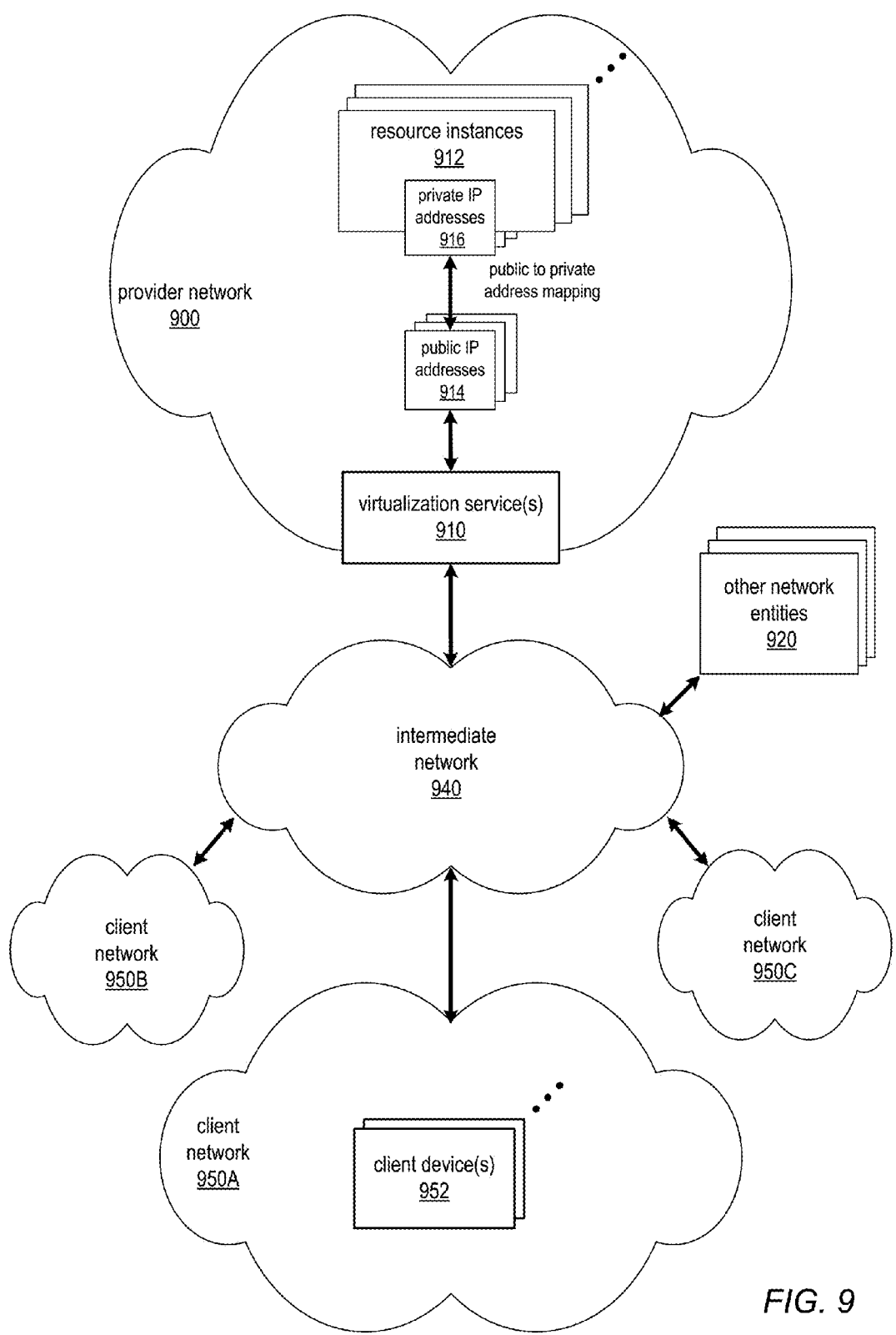
FIG. 9 illustrates an example provider network environment, according to at least some embodiments.

FIG. 9 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

FIG. 10 illustrates an example data center that implements an overlay network on a network substrate using IP tunneling technology, according to at least some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 10, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

Figure 11:
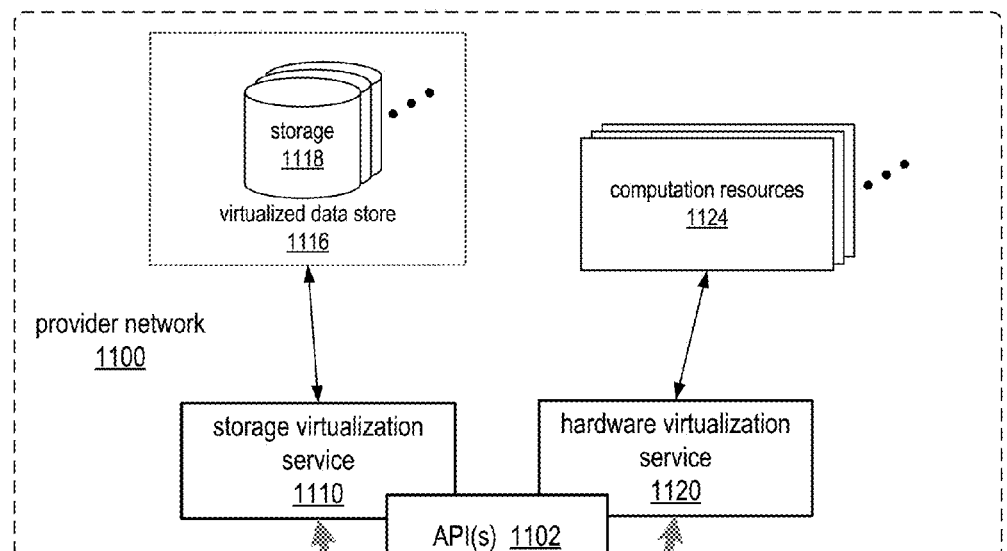
FIG. 11 is a block diagram of an example provider network that provides a storage virtualization service and a hardware virtualization service to clients, according to at least some embodiments.
Figure 11:
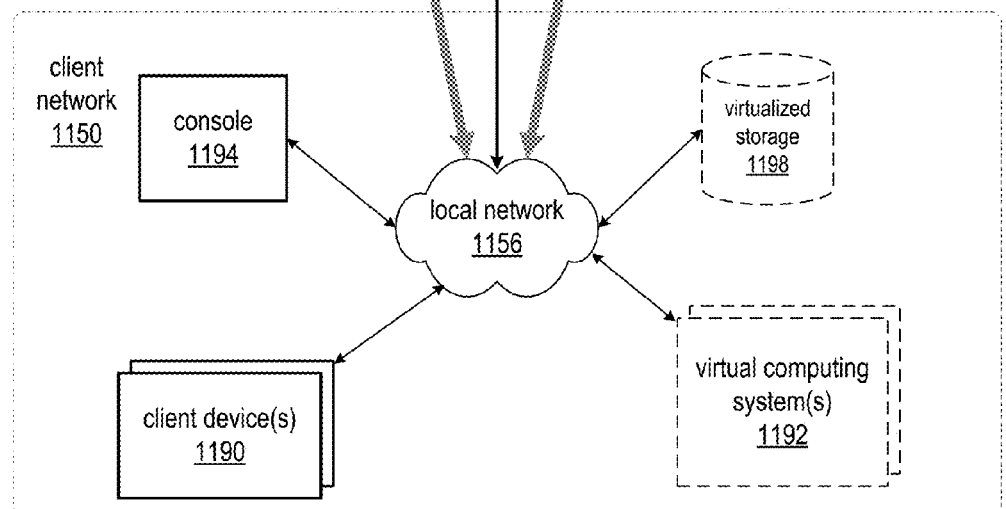

FIG. 11 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

FIG. 12 illustrates an example provider network that provides private networks on the provider network to at least some clients, according to at least some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In at least some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more subnetworks, or subnets, 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtualized private network 1260 as illustrated in FIG. 12 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 12 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

FIG. 13 illustrates subnets and security groups in an example virtual private network implementation on a provider network, according to at least some embodiments. In at least some embodiments, a provider network such as provider network 1200 in FIG. 12 may allow the client to establish and manage virtual security groups 1316 within the client's virtual private network 1310, within or across subnets 1314. A security group 1316 acts as a firewall that controls the traffic allowed to reach one or more resource instances 1318 within the security group 1316. The client may establish one or more security groups 1316 within the private network 1310, and may associate each resource instance 1318 in the private network 1310 with one or more of the security groups 1316. In at least some embodiments, the client may establish and/or modify rules for each security group 1316 that control the inbound traffic allowed to reach the resource instances 1318 associated with the security group 1316.

In the example virtual private network 1310 shown in FIG. 13, the private network 1310 is subdivided into two subnets 1314A and 1314B. Access to the private network 1310 is controlled by gateway(s) 1330. Each subnet 1314 may include at least one router 1312 that acts to route traffic to (and from) resource instances 1318 on the respective subnet 1314. In the example shown in FIG. 13, resource instances 1318A through 1318E are on subnet 1314A, and resource instances 1318F through 1318J are on subnet 1314B. The client has established four security groups 1316A through 1316D. As shown in FIG. 13, a security group may extend across subnets 1314, as does security group 1316A that includes resource instances 1318A and 1318B on subnet 1314A and resource instance 1318F on subnet 1314B. In addition, a resource instance 1318 may be included in two or more security groups 1316, as is resource instance 1318A which is included in security group 1316A and 1316B.

Illustrative System

Figure 14:
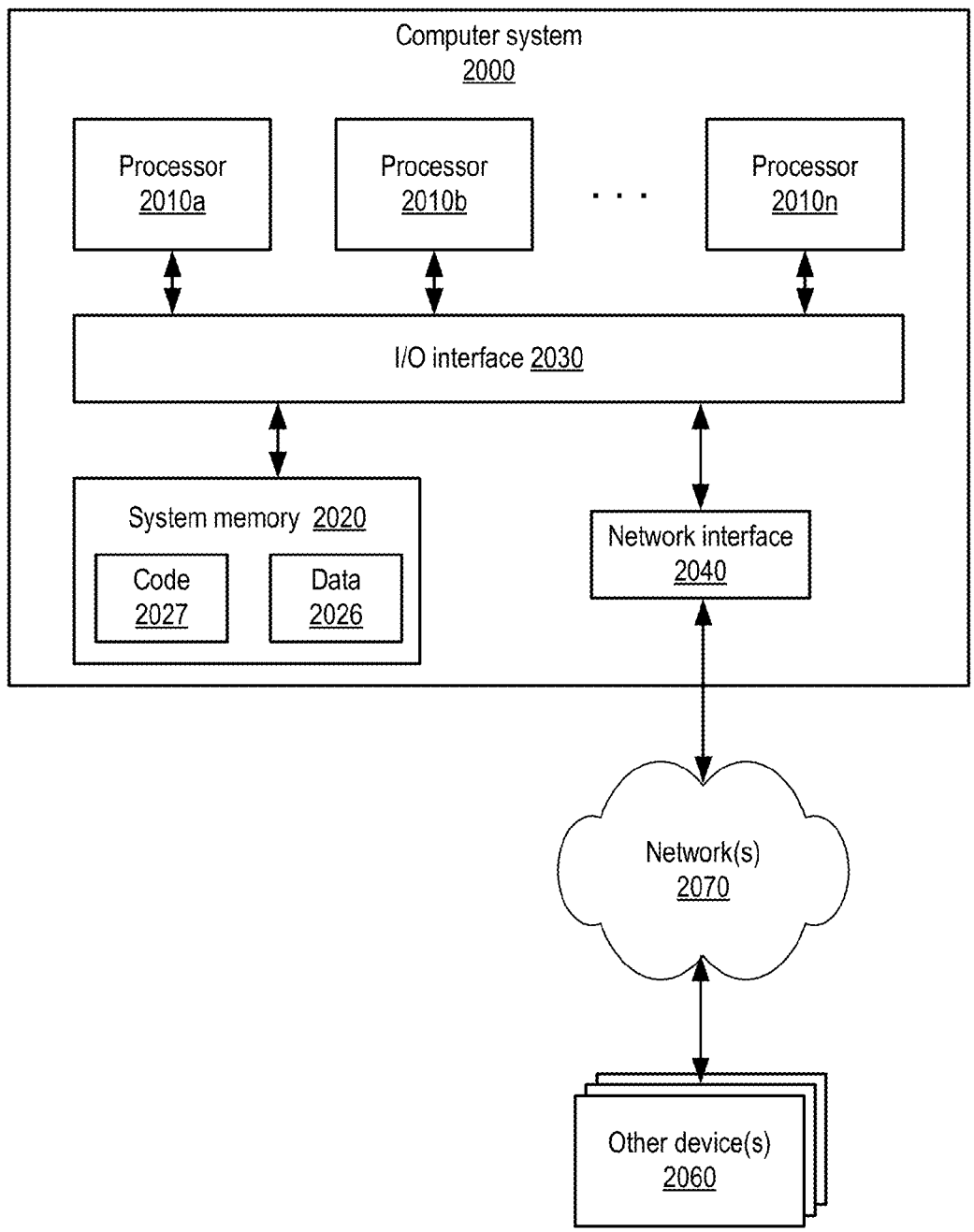
FIG. 14 is a block diagram illustrating an example computer system that may be used in some embodiments.

In at least some embodiments, a server that implements a portion or all of the methods and apparatus for private network peering in virtual network environments as described herein may include a general-purpose computer system that includes or is configured to access one or more computer-accessible media, such as computer system 2000 illustrated in FIG. 14. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for private network peering in virtual network environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 13, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 13 for implementing embodiments of private network peering in virtual network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A provider network, comprising:
a network substrate;
a plurality of host devices implementing a plurality of resource instances for clients of the provider network, wherein subsets of the resource instances are provisioned in virtual networks for the clients on the provider network;
one or more computing devices implementing a peering service, wherein the one or more computing devices implementing the peering service are configured to:
determine routing information for routing network packets between one or more resource instances of a first virtual network and one or more resource instances of another virtual network via a peering on the provider network; and
enable the first virtual network and the other virtual network to exchange network packets via the peering on the provider network, wherein the packets are addressed to respective private IP addresses of the first virtual network or the other virtual network when being transmitted from a resource instance of the first virtual network or the other virtual network.

2. The provider network as recited in claim 1, wherein, to establish the peering on the provider network, the one or more computing devices implementing the peering service are further configured to:
establish a first virtual port for the first virtual network and another virtual port for the other virtual network; and
obtain, via an application programming interface (API) from a first client and another client, routing information for the first virtual port and the other virtual port, respectively.

3. The provider network as recited in claim 2, wherein the routing information for a given virtual port indicates a range of private IP addresses of the respective virtual network that are advertised from the given virtual port and a range of private IP addresses that are accepted at the given virtual port.

4. The provider network as recited in claim 3, wherein a subset of private IP addresses that is served by the peering on the provider network for a given virtual network is the intersection of the range of private IP addresses that are advertised from the respective virtual port and the range of private IP addresses that are accepted at the other virtual port of the peering on the provider network.

5. The provider network as recited in claim 1, wherein, to establish the peering on the provider network, the one or more computing devices implementing the peering service are configured to:
establish a first peering process instance for the first virtual network; and
establish another peering process instance for the other virtual network;
wherein the first peering process instance and the other peering process instance are configured to exchange the network packets over the network substrate according to an overlay network protocol.

6. The provider network as recited in claim 5, wherein, to exchange the network packets over the network substrate according to the overlay network protocol, one or more computing devices implementing each peering process instance are configured to:
receive network packets from the first virtual network or the other virtual network;
encapsulate the network packets according to an encapsulation protocol to generate encapsulation packets; and
send the encapsulation packets onto the network substrate to be routed to the peering process instance or the other peering process instance according to routing information in the encapsulation packets.

7. The provider network as recited in claim 6, wherein, to exchange the network packets over the network substrate according to the overlay network protocol, the one or more computing devices implementing the first peering process instance or the other peering process instance are further configured to:
receive encapsulated packets from the peering process instance or the other peering process instance;
decapsulate the network packets from the received encapsulated packets; and send the decapsulated network packets to the first virtual network or the other virtual network for routing to endpoints on the first virtual network or for routing to endpoints on the other virtual network.

8. A method, comprising:
provisioning, on a provider network, a plurality of resource instances for clients of the provider network, wherein subsets of the resource instances are provisioned in virtual networks of the clients hosted by the provider network;
determining, by a peering service implemented on one or more computing devices in the provider network, routing information for routing network packets between one or more resource instances of a first virtual network and one or more resource instances of another virtual network; and
exchanging network packets between the first virtual network and the other virtual network over a peering on a network substrate of the provider network, wherein the packets are addressed to respective private IP addresses of the first virtual network or the other virtual network when being transmitted from a resource instance of the first virtual network or the other virtual network.

9. The method as recited in claim 8, further comprising:
obtaining, by the peering service, a request from the first virtual network to open the peering to the other virtual network;
providing, by the peering service, to the other virtual network, an indication of the peering request from the first virtual network; and
establishing the peering on the network substrate of the provider network between the first virtual network and the other virtual network, in response to an indication that the peering request from the first virtual network is accepted by the other virtual network.

10. The method as recited in claim 9, wherein said establishing the peering between the first virtual network and the other virtual network over the network substrate of the provider network comprises:
establishing a peering process instance for the first virtual network and another peering process instance for the other virtual network;
establishing a virtual port for the first virtual network at the peering process instance and another virtual port for the other virtual network at the other peering process instance; and
establishing the peering between the virtual ports over the network substrate according to an overlay network protocol.

11. The method as recited in claim 10, wherein said exchanging the network packets between the first virtual network and the other virtual network over the peering on the network substrate comprises:
receiving network packets at the peering process instance from the first virtual network;
encapsulating the network packets according to an encapsulation protocol to generate encapsulation packets; and
sending the encapsulation packets via the virtual port onto the network substrate to be routed to the other virtual port at the other peering process instance according to routing information in the encapsulation packets.

12. The method as recited in claim 10, wherein said exchanging the network packets between the first virtual network and the other virtual network over the peering on the network substrate comprises:

receiving encapsulated packets at the virtual port of the peering process instance;
decapsulating network packets from the received encapsulated packets; and
providing the decapsulated network packets to the virtual network for routing, according to private IP addresses, to endpoints on the virtual network.

13. The method as recited in claim 10, further comprising:
establishing another virtual port for the first virtual network at the peering process instance; and
establishing another peering between the first virtual network and a third virtual network at the other virtual port.

14. The method as recited in claim 9, further comprising providing, by the peering service, an application programming interface (API) to the clients, wherein said obtaining, said providing, and said establishing are performed according to the API.

15. The method as recited in claim 8, wherein said exchanging the network packets between the first virtual network and the other virtual network over the peering on the network substrate comprises translating private network addresses from private address spaces of the first virtual network and the other virtual network into an intermediate address space for delivery over the peering.

16. The method as recited in claim 8, wherein the other virtual network is on a different provider network implemented in a separate data center.

17. A non-transitory computer-accessible storage medium storing program instructions, that when executed on one or more processors, cause the one or more processors to implement a peering service in a provider network, wherein the program instructions when executed on the one or more processors cause the peering service to:
provide an application programming interface (API) to clients of the provider network, wherein subsets of a plurality of resource instances on the provider network are provisioned in virtual networks for the clients on the provider network; and
based on a peering between a first virtual network and another virtual network being requested via the API of the peering service:
determine routing information for routing network packets between the first virtual network and the other virtual network; and
enable the first virtual network and the other virtual network to exchange network packets between the first virtual network and the other virtual network via the peering between the first virtual network and the other virtual network, wherein the network packets are addressed to respective private IP addresses of the first virtual network or the other virtual network when being transmitted from a resource instance of the first virtual network or the other virtual network.

18. The non-transitory computer-accessible storage medium as recited in claim 17, wherein, to establish the peering on the provider network, the program instructions when executed on the one or more processors further cause the peering service to:
establish a first virtual port for the first virtual network and another virtual port for the other virtual network; and
obtain routing information for the first virtual port and the other virtual port, wherein the routing information for each virtual port indicates a range of addresses that are advertised from the respective virtual port and a range of addresses that are accepted at the respective virtual port.

19. The non-transitory computer-accessible storage medium as recited in claim 17, wherein, to establish the peering on the provider network, the program instructions when executed on the one or more processors further cause the peering service to:
- establish a first peering process instance for the first virtual network and another peering process instance for the other virtual network;
- establish a first virtual port for the first virtual network at the first peering process instance and another virtual port for the other virtual network at the other peering process instance; and
- establish the peering between the first virtual port and the other virtual port over the network substrate.

20. The non-transitory computer-accessible storage medium as recited in claim 19, wherein the first peering process instance and the other peering process instance are established at an encapsulation layer of the network substrate, and wherein the first peering process instance and the other peering process instance are configured to exchange traffic between the first virtual network and the other virtual network over the network substrate via the peering according to an encapsulation protocol.

\* \* \* \* \*